United States Patent
Ahmed

(10) Patent No.: US 11,403,572 B2
(45) Date of Patent: Aug. 2, 2022

(54) METHOD AND SYSTEM FOR REQUESTING SERVICE PROVIDERS IN REAL TIME

(71) Applicant: Mian Ahmed, Fremont, CA (US)

(72) Inventor: Mian Ahmed, Fremont, CA (US)

( * ) Notice: Subject to any disclaimer, the term of this patent is extended or adjusted under 35 U.S.C. 154(b) by 267 days.

(21) Appl. No.: 16/041,408

(22) Filed: Jul. 20, 2018

(65) Prior Publication Data

US 2018/0330308 A1 Nov. 15, 2018

Related U.S. Application Data

(60) Provisional application No. 62/535,031, filed on Jul. 20, 2017.

(51) Int. Cl.
*G06Q 30/00* (2012.01)
*G06Q 10/06* (2012.01)
*G06Q 50/10* (2012.01)
*G06F 16/29* (2019.01)

(52) U.S. Cl.
CPC ..... *G06Q 10/063116* (2013.01); *G06F 16/29* (2019.01); *G06Q 10/06312* (2013.01); *G06Q 10/06314* (2013.01); *G06Q 50/10* (2013.01)

(58) Field of Classification Search
CPC ........... G06Q 10/06; G06Q 10/063116; G06Q 10/06312; G06Q 10/06314; G06Q 50/10; G06Q 10/06395; G06Q 10/00; G06Q 10/02; G06Q 10/10; G06Q 30/02; G06F 16/29; G05B 2219/31357
See application file for complete search history.

(56) References Cited

U.S. PATENT DOCUMENTS

| | | | | |
|---|---|---|---|---|
| 8,364,513 B2* | 1/2013 | Mitchell | ............ | G06Q 10/1093 705/7.13 |
| 2003/0004774 A1* | 1/2003 | Greene | ................. | H04L 63/102 705/7.14 |
| 2003/0220835 A1* | 11/2003 | Barnes, Jr. | ............. | G06Q 10/02 379/93.12 |

(Continued)

OTHER PUBLICATIONS

Esztergár-Kiss, Domokos & Csiszar, Csaba. (2015). Evaluation of Multimodal Journey Planners and Definition of Service Levels. International Journal of Intelligent Transportation Systems Research. 13. 154-165. (Year: 2015).*

*Primary Examiner* — Joseph M Waesco
*Assistant Examiner* — Jay-Ming Wang
(74) *Attorney, Agent, or Firm* — SmokeGroup, PLC; Kenneth F. Brooks

(57) ABSTRACT

A system and method for requesting service providers in real time. The system comprises a service request server and at least one database. The service request server is configured to enable a requestor such as customer to provide a request for service. The request includes type of service required and location where service is required. The server is further configured to display approved, authentic and qualified service providers matching the request provided by the requestor, within a particular area defined by the requestor. The server is further configured to provide a notification of the request to the service provider to accept or deny the request. The server is further configured to connect the service provider and the requestor on acceptance of the request. The server is further configured to process invoice on completion of service by the service provider.

7 Claims, 6 Drawing Sheets

(56) References Cited

U.S. PATENT DOCUMENTS

| | | | | |
|---|---|---|---|---|
| 2005/0240621 A1* | 10/2005 | Robertson | | H04L 63/08 |
| | | | | 707/999.102 |
| 2006/0041374 A1* | 2/2006 | Inoue | | H04L 67/36 |
| | | | | 701/500 |
| 2008/0227473 A1* | 9/2008 | Haney | | H04W 12/08 |
| | | | | 455/457 |
| 2010/0088032 A1* | 4/2010 | Nielsen | | G01C 15/06 |
| | | | | 702/5 |
| 2010/0117654 A1* | 5/2010 | Nielsen | | G06Q 10/06 |
| | | | | 345/629 |
| 2011/0213859 A1* | 9/2011 | Greene | | G06Q 10/06398 |
| | | | | 709/218 |
| 2011/0275388 A1* | 11/2011 | Haney | | H04W 4/025 |
| | | | | 455/457 |
| 2012/0071129 A1* | 3/2012 | Haney | | H04W 4/021 |
| | | | | 455/404.1 |
| 2013/0073400 A1* | 3/2013 | Heath | | G06Q 50/01 |
| | | | | 715/738 |
| 2013/0130715 A1* | 5/2013 | Haney | | H04M 1/72418 |
| | | | | 455/456.1 |
| 2013/0144523 A1* | 6/2013 | Haney | | H04M 1/72418 |
| | | | | 701/538 |
| 2013/0218681 A1* | 8/2013 | Haney | | H04M 1/72418 |
| | | | | 705/14.58 |
| 2014/0148135 A1* | 5/2014 | Haney | | G01S 19/01 |
| | | | | 455/414.1 |
| 2014/0295895 A1* | 10/2014 | Haney | | H04M 1/0202 |
| | | | | 455/457 |
| 2014/0378167 A1* | 12/2014 | Haney | | H04W 4/08 |
| | | | | 455/456.3 |
| 2015/0253449 A1* | 9/2015 | Nielsen | | G01V 3/10 |
| | | | | 702/5 |
| 2015/0264532 A1* | 9/2015 | Spears | | H04W 4/029 |
| | | | | 455/456.3 |
| 2015/0269500 A1* | 9/2015 | Nielsen | | G06F 16/29 |
| | | | | 705/7.11 |
| 2016/0063191 A1* | 3/2016 | Vesto | | G16H 50/50 |
| | | | | 705/2 |
| 2016/0140776 A1* | 5/2016 | Ricci | | G06F 3/0484 |
| | | | | 701/32.7 |
| 2016/0241565 A1* | 8/2016 | Greene | | G06Q 10/10 |
| 2016/0381227 A1* | 12/2016 | Singh | | G06Q 30/0601 |
| | | | | 379/202.01 |
| 2017/0293950 A1* | 10/2017 | Rathod | | G06Q 30/0283 |

\* cited by examiner

METHOD AND SYSTEM FOR REQUESTING SERVICE PROVIDERS IN REAL TIME

CROSS REFERENCE TO RELATED APPLICATION

The present application claims the benefit of U.S. Provisional Patent Application No. 62/535,031 for "Method and System for Requesting Service Providers in Real Time", filed Jul. 20, 2017, the contents of which is hereby incorporated by reference.

BACKGROUND OF THE INVENTION

A. Technical Field

The present invention generally relates to customer service, and more specifically relates to a system and method for requesting service providers in real time.

B. Description of Related Art

In present day, customers often encounter service repairs like plumbing, electrical, roofing, carpentry, heating and air, maids, handyman solutions, air conditioning, carpet cleaning, appliances, security, CCTV installation, cable and dish installation, furniture repair, landscaper, tree removal, pest control, or many other residential or commercial services. Conventional method employed to connect customers with service providers involves contacting the service provider through their mobile numbers and wait for their arrival, which comprises many drawbacks One problem is that many customers have hard time to get a licensed, insured, bonded, reliable, back ground checked, drug free service providers.

Another problem is that whenever the customer has an emergency break down they want the service provider arrive in no time and the service provider claim to be locally available few miles away from customer service location and create bogus appearance either on internet or print media using local numbers and inaccurate location because they are not local.

Another problem is that many service providers promise an arrival time with the customer but they don't arrive in that time frame and customer have no means to track when the service provider is arriving or even he is in route or changed mind to not to even come. Hence there is no visibility or track where the service provider is.

Another problem is that the customers get surprised when upon arrival they come to know that the service provider who came to their service location after hours of waiting is hence not capable to do that job. The service provider or customer did not make clear what type of services customer need and if the service provider who is coming have expertise in performing those services.

Another problem is that most of the review sites don't show accurate reviews about service providers which makes customer confuse about their work ethics, because any one can create account and post un real reviews in favor of service providers. This makes customers to pick those service providers but after the service is performed in some cases the customer ends up in posting a negative feedback.

Another problem is that when the customers get a worse experience from a service provider there is no other service or system that block or prevent those service providers from appearing in front of other customers.

Another problem is that customers after encountering with an emergency break down don't know if the service provider they are choosing is even ready to fulfill that service request or not. There is no on-line status of the service provider if they are ready to work or not just a profile on-line doesn't mean a service provider is available.

Prior art US20170140323A1 of John Casey Laird et al. describes a system and method for facilitating communication sessions between consumers and service providers. The system is directed to receiving, from a consumer, a request for a product or service. The request is analyzed to determine one or more service providers that perform or provide the requested product or service. When various service providers are identified, an algorithm ranks the service providers from high to low. The highest ranked service provider is provided with an opportunity to instantly begin a communication with the consumer. If the highest ranked service provider declines, the next highest service provider is given the opportunity. However, the above patent reference only directed to determine service provider based on ranks and lacks to identify and connect with service providers based on estimated time of arrival, location, certifications. Further, the patent reference lacks to track the location of the service provider in real time and preferences to change schedule or cancel the provided service request.

Hence, it is necessary to provide customers with a system that would overcome customer's major objections like, getting service technicians estimated time of arrival, identify and connect with certified, licensed back ground checked service providers with true positive reviews, track service provider current location while service provider being driving and confirming that the service provider coming to customer location is fully capable of performing that work.

SUMMARY OF THE INVENTION

The disclosure provides a system and method to identify and acquire assistance of a local, clean, professional, real, experienced, service providers in real time.

One aspect of the invention includes a cloud, wireless, wide area, wired network system architecture. Another aspect of the invention includes the method for initiating and accepting service request via the cloud, wireless network. Another aspect of the invention includes the method of confirming the availability of service providers via cloud, wireless, wide area network. Another aspect of the invention includes a method of displaying approved, authentic, qualified service providers in real time with in defined radius. Another aspect of invention includes the method of displaying the closest service provider to the service location based upon the performance from a given preference list. Another aspect of the invention includes the method to locate the service provider exactly according to customer search where the request broadcasts to the defined no of service providers on remote or wired devices via cloud, wireless, wired network system.

Another aspect of the invention includes the method for accepting the service request by set of available and ready service provider with in the required time where if no service provider accepts the service request it moves on to next set of service providers. Another aspect of invention includes the real-time travel display the route time calculation through a track or a route display along with the time of arrival of service provider. Another aspect of invention includes the method of displaying most efficient and quickest route to customer and service provider the same real-time drive route is displayed on customer and service provider devices. Another aspect of the invention includes the feedback process where only the customers who received service can rate the service providers not even other customers on same system can rate a service provider until they request a service not any other user can rate any service provider.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
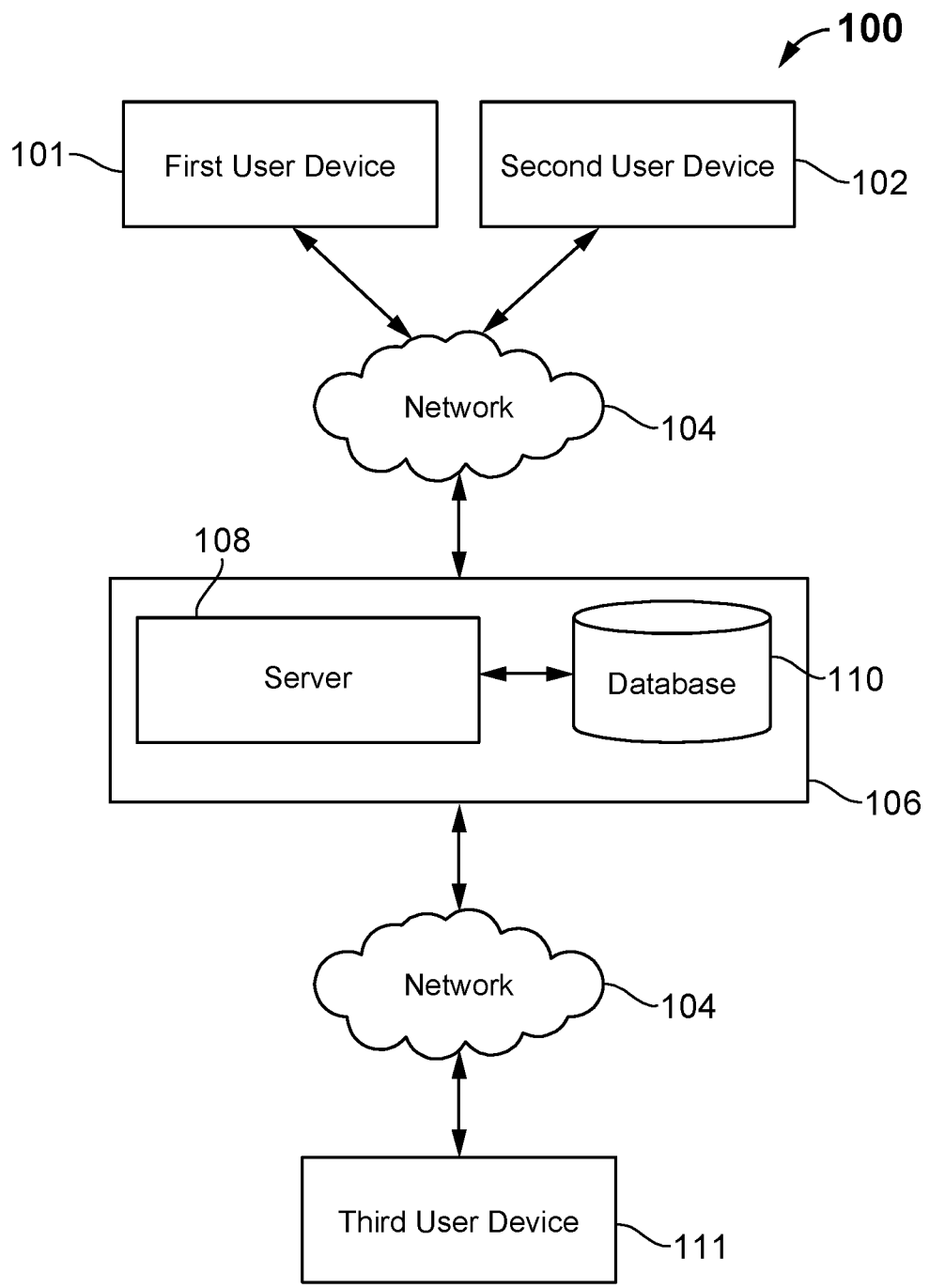
FIG. 1 exemplarily illustrates an environment implemented in accordance with various embodiments of the invention.

The present invention discloses a system and method for requesting a service provider in real time. The system enables a requestor such as a customer or a user requiring service providers to connect with a preferred service provider. Referring to FIG. 1, a block diagram of an environment 100 implemented in accordance with various embodiments of the present invention is disclosed. The environment 100 comprises a first user device 101 associated with a first user, a second user device 102 associated with a second user, a third user device 111 associated with a third user, a network 104, and a web-based service request system 106 connecting service provider with the customer. In an embodiment, the service request system 106 comprises a service request server 108 and at least one database 110.

In an embodiment, the first user device 101, second user device 102 and third user device 11 are enabled to access the service request system 106 via the network 104. In an embodiment, the first user is a customer or a requestor requiring service. In an embodiment, the second user is a service provider or technician providing service. In an embodiment, the third user is a company operated service provider or service provider associated with the company. In one embodiment, the service request server 108 is configured to enable the requestor to provide a request for service. The request includes type of service required and location where service is required. The server 108 is further configured to display approved, authentic and qualified service providers matching the request provided by the requestor, within a particular area defined by the requestor. The server 108 is further configured to provide a notification of the request to accept or deny the request. The server 108 is further configured to connect the service provider and the requestor on acceptance of the request. The server 108 is further configured to process invoice on completion of service by the service provider.

In an embodiment, the user device (101, 102, 111) is in communication with the network 104 to access the service request server 108. In an embodiment, the network 104 could be Wi-Fi network, WiMax network, and wireless local area network. In one embodiment, the user device (101, 102, 111) is at least anyone of a desktop, a laptop, a tablet, a mobile phone, mobile and/or handheld electronic devices, personnel digital assistants, smart phones, smart televisions, palm tops and phablets.

In one embodiment, the at least one database 110 may be accessible by the service request server. The database 110 may be integrated into the service request server or separate from it. In some embodiments, the database 110 resides in a connected server or in a cloud computing service. Regardless of location, the database 110 comprises a memory to store and organize certain data for use by the service request server 108. In some embodiments, the database 110 stores information relating to a customer, service provider and company operated service provider. The database 110 comprises information to identify the customer, service provider and the company, types of service such as plumbing, electrical, roofing, carpentry, heating and air, maids, handyman solutions, air conditioning, carpet cleaning, appliances, security, CCTV installation, cable and dish installation, furniture repair, landscaper, tree removal, pest control, and other residential and commercial services, map data and payment data.

In one embodiment, the service request server 108 is at least one of a general or special purpose computer. The service request server 108 could be operated as a single computer, which can be a hardware and/or software server, a workstation, a desktop, a laptop, a tablet, a mobile phone, a mainframe, a supercomputer, a server farm, and so forth. In some embodiments, the computer could be touchscreen and/or non-touchscreen and adopted to run on any type of OS, such as iOS™, Windows™, Android™, Unix™, Linux™ and/or others. In one embodiment, the plurality of computers is in communication with each other, via networks. Such communication can be via a software application, a mobile app, a browser, an OS, and/or any combination thereof. Further, a block diagram 200 of an exemplary implementation of the service request server (108 or 201) is illustrated in FIG. 2.

Figure 2:
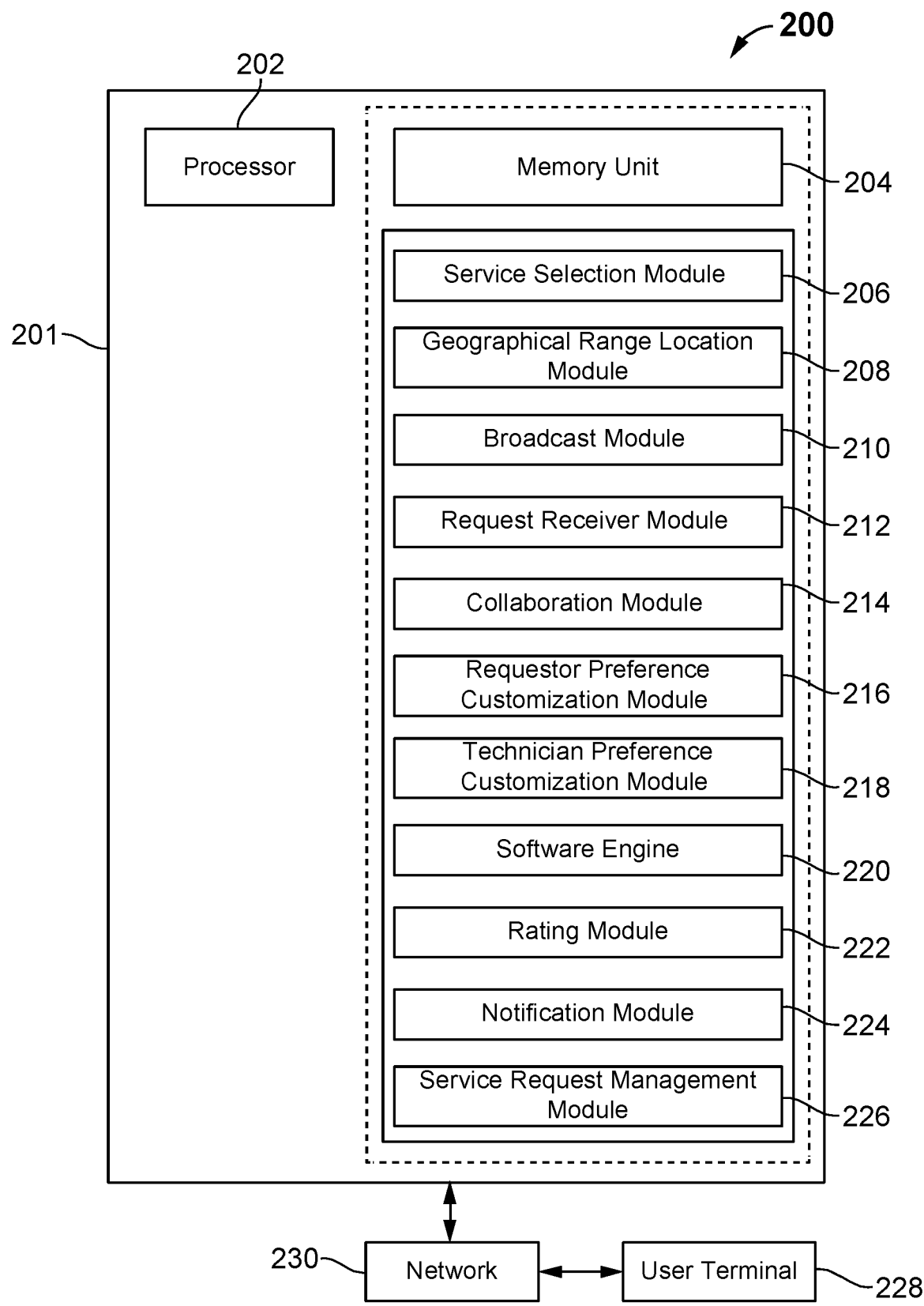
FIG. 2 exemplarily illustrates a block diagram of a service request server, according to an embodiment of the present invention.

FIG. 2 is a block diagram 200 of the service request server 201 in an embodiment of the present invention. The server 201 comprises a processor 202 and a memory unit 204. The memory unit 206 comprises a set of program modules comprises a service selection module 206, a geographical range location module 208, a broadcast module 210, a request receiver module 212, a collaboration module 214, a requestor preference a customization module 216, a technician preference customization module 218, a software engine 220 and a rating module 222. In one embodiment, a user access server 201 via a user terminal 228 via a network 230. In some embodiments, the network 230 is at least anyone of a Wi-Fi network, WiMax network, and wireless local area network. In some embodiments, the user terminal 228 is at least anyone of a desktop, a laptop, a tablet, a mobile phone, mobile and/or handheld electronic devices, personnel digital assistants, smart phones, smart televisions, palm tops and phablets. In an embodiment, the user is requestor or customer, service provider or service technician, or service provider associated with the company.

In one embodiment, the server 201 is configured to connect service provider and customer in real time. The service selection module 206, executed by the processor 202, is configured to enable the requestor to provide a request for a service, wherein the request includes a type of service required, preferred service technician, date, and time, and customer specified location where the service need to be performed. Further, the service selection module 206 is configured to enable the requestor to select preferences such as licensed service provider, insured service provider, bonded service provider, certified service provider, or screened service provider or service provider without license. In one embodiment, the system further provides details of the service provider such as number of service provider in the requestor specified location, estimated time of arrival (ETA) of the service provider and distance between the service provider and the requestor before selection of the request. In another embodiment, the system enables the requestor to The geographical range location module 208, executed by the processor 202, is configured to locate one or more service provider matching the request provided by the requestor within a particular area relative to the preferred location. The server 201 starts searching the appropriate service provider and finds exact match using customer provided information. In one embodiment, one or more service provider includes a company operated service providers.

The broadcast module 210 in communication with the geographical range location module 208, executed by the processor 202, is configured to broadcast the request to the one or more service provider for specific period of time. The request receiver module 212, executed by the processor 202, is configured to present or display the broadcasted request to the service provider to accept or to deny the request for a specific period of time. The request receiver module 212 is further configured to enable the service technician to accept at least one service request before finishing the ongoing service request.

In one embodiment, if one or more service provider identified is a company operated service providers, the request receiver module 212 displays the service request on company dashboard through software engine 220 for a set defined time to accept or reject the request. If no service provider accepts the service request, the geographical range location module 208 would locate a next set of defined service providers based on the request of the customer and broadcasts the service request via the broadcast module 210. This process continues until any one service provider accepts that service request.

On acceptance of the request, the collaboration module 214, executed by the processor 202, is configured to connect the service provider and the requestor. Further, the geographical range location module 208 in communication with the collaboration module 214 is configured to creates a real-time drive route from the service provider current location to the customer service location. Further, the geographical range location module 208 is configured to notify the customer about the service provider being in route along with service provider's estimated time of arrival. In one embodiment, the service provider on acceptance of the request, he or she could drive to service location on his or will, which provides the time to clear any ongoing call of the service provider. The server 201 is configured to send notification to the customer via the notification module 224, about which service provider accepted request and gets another notification when service provider gets en-route with the route and drive line on map. The rating module 222, executed by the processor 202, is configured to enable the customer to rate the service provider work confirming the service completion. The software engine 220, executed by the processor 202, is configured to process invoice for the service provided by the service provider.

The requestor preference customization module 216, executed by the processor 202, is configured to enable the requestor to set a first criterion to automatically receive notification respective of one or more service technician on satisfaction of the set first criterion, wherein the first criterion includes preferred month, day, time and location. For example, if the requestor sets a specific day and time of the month, and if any service provider enters into a location relation to the location specified by the requestor on set time, day of the month, then the server 201 sends notification to the customer about the number of service provider, ETA and distance between the service provider and the requestor specified service location.

The requestor preference customization module 216, executed by the processor 202, is further configured to enable the requestor to set a second criterion to automatically receive notification of one or more service technician on satisfaction of the set second criterion, wherein the second criterion includes preferred service technician and location of the preferred service technician for example, if his or her preferred pro or the one who worked in his/her house in past is in neighborhood or nearby his house, the server automatically send service request to the service provider. If the service provider accepts the request, the system would connect the requestor and the service provider for further proceedings.

The requestor preference customization module 216, executed by the processor 202, is further configured to enable the requestor to set a third criterion to automatically receive notification of one or more service technician on satisfaction of the set third criterion, wherein the third criterion includes preferred types of service he/she wants in future. For example, when the service provider belonging or linked to that particular one or more services enters in the customers neighborhood or set radius of customer specified service location, the server 201 will send the push notification to customer about those service providers being nearby. Then, the customer could connect with the service provide in neighborhood, this could save them a huge time for not waiting someone in any other time and have someone come at same time.

The service request management module 226, executed by the processor 202, is configured to enable the requestor or service provider to cancel or reschedule the service request while being in-route or during driving. If the requestor reschedules the time, the service provider would receive details of reschedule via a notification module 224.

The service provider either could accept the service request or reply back with other time or date based on his or her availability. The response of the service provider is sent to the requestor via the notification module 224.

The technician preference customization module 218, executed by the processor 202, is configured to enable the service provider to set preferences to automatically send notification to one or more requestor on entering a particular location. For example, if the service provider enters a particular city or zip code, the server tracks his or her latitude and longitude and send push notifications automatically to customers who want same related services.

Figure 3:
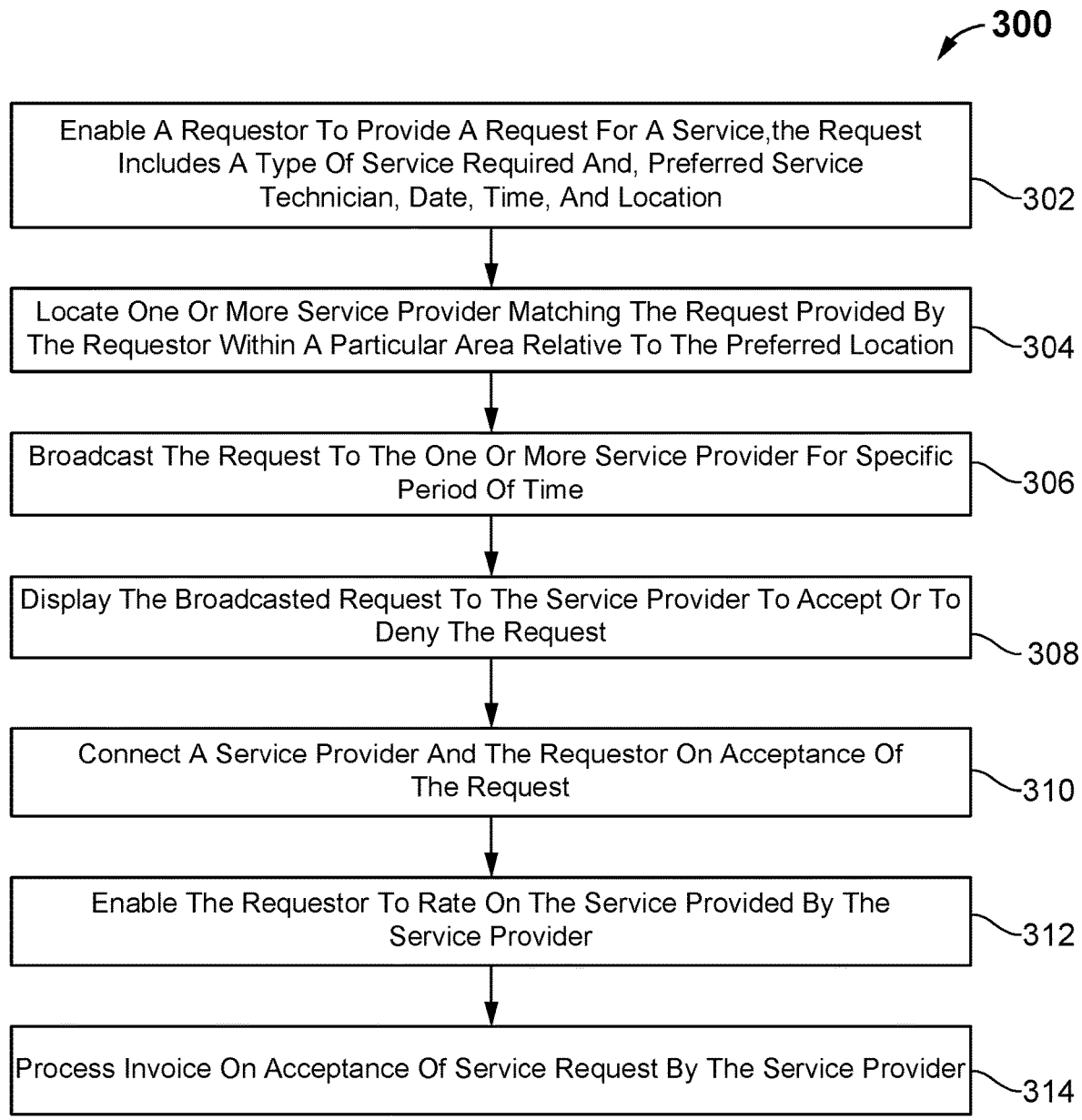
FIG. 3 exemplarily illustrates a method for requesting service providers in real time, according to an embodiment of the present invention.

Referring to FIG. 3, a web-based method 300 for requesting service provider in real time is illustrated. In one embodiment, the method 300 is incorporated in the system comprising a server with a processor and a memory unit, a database in communication with the server for storing information related to the service provider, the customer and map data, and a first user device and a second user device configured to access the server via a network. At step 302, the method 300 includes, enabling at the processor, via a service selection module, a requestor to provide a request for a service, wherein the request includes a type of service required and, preferred service technician, date, time, and location. At step 304, the method 300 includes, locating at the processor, via a geographical range location module, one or more service provider matching the request provided by the requestor within a particular area relative to the preferred location.

At step 306, the method 300 includes, broadcasting at the processor, via a broadcast module in communication with the geographical range location module, the request to the one or more service provider for specific period of time. At step 308, the method 300 includes, displaying at the processor, via a request receiver module, the broadcasted request to the service provider for acceptance or to deny the request. At step 310, the method 300 includes, connecting at a processor, via a collaboration module, the service provider and the requestor on acceptance of the request. At step 312, the method 300 includes, enabling at the processor, via a rating module, the requestor to rate on the service provided by the service provider. At step 314, the method 300 includes, processing at the processor, via a software engine, invoice for the service provided by the service provider.

Figure 4:
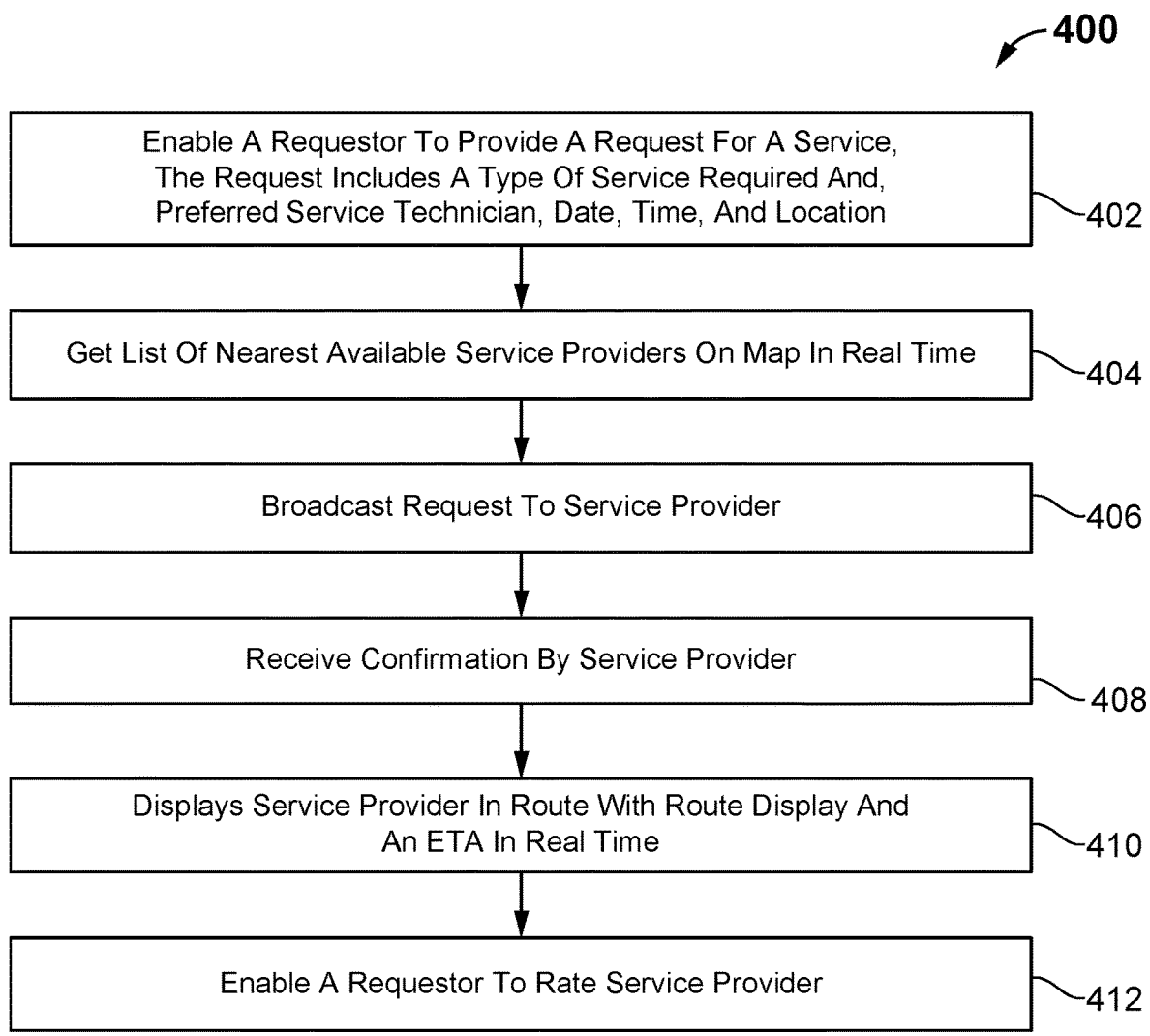
FIG. 4 exemplarily illustrates a process flow of the customer, according to an embodiment of the present invention.

Referring to FIG. 4, a process flow 400 of the customer is illustrated. At step 402, the requestor is enabled to provide a request for a service, the request includes a type of service required and, preferred service technician, date, time, and location. At step 404, a list of nearest available service providers is displayed to the requestor in real time. At step 406, the request is broadcasted to the list of service provider. At step 408, the requestor receives confirmation from at least one service provider. At step 410, the service provider in route with route display and an ETA in real time is displayed to the requestor. At step 412, the requestor is enabled to rate the service provider.

Figure 5:
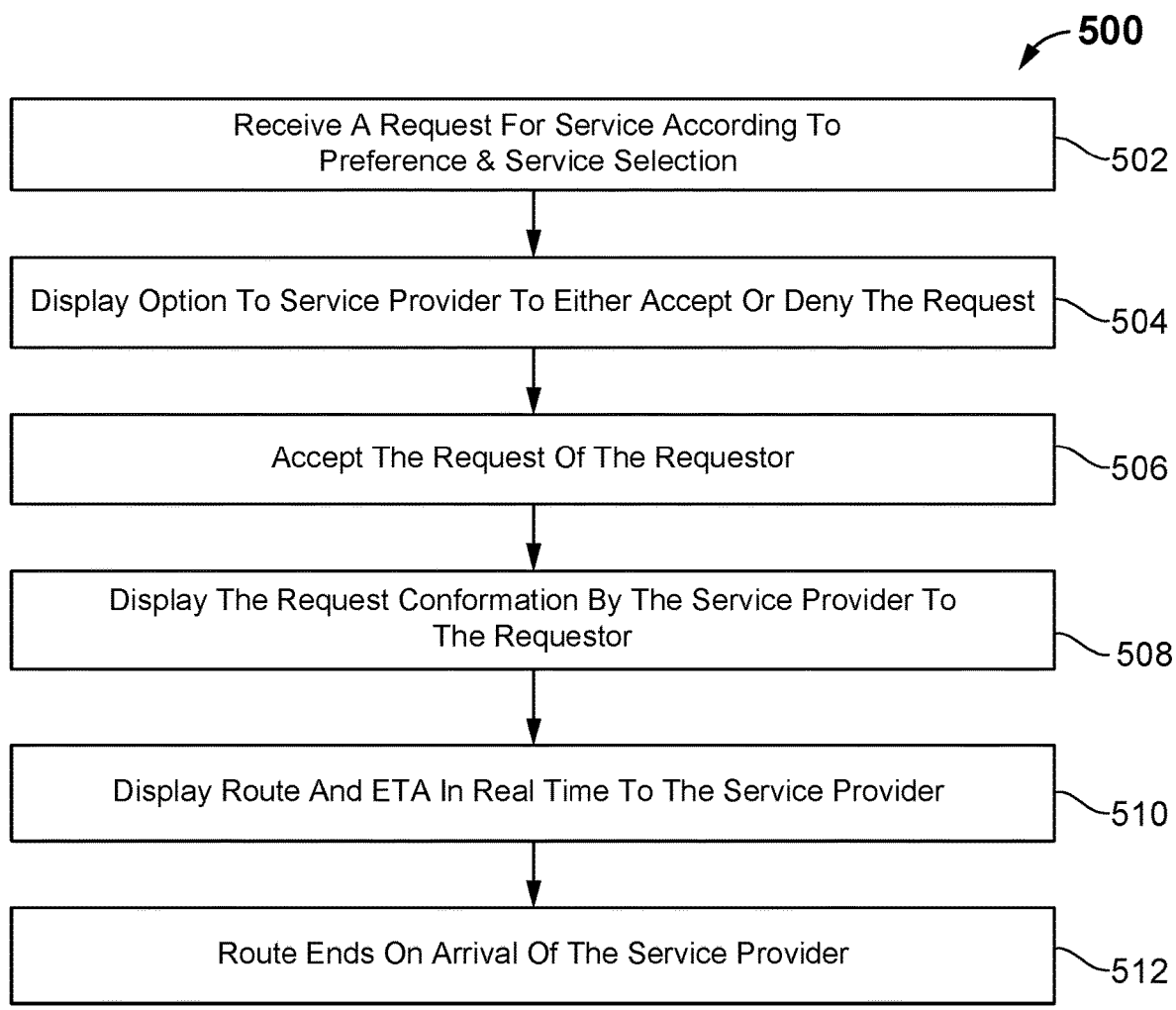
FIG. 5 exemplarily illustrates a process flow of the service provider, according to an embodiment of the present invention.

Referring to FIG. 5, a process flow 500 of the service provider is illustrated. At step 502, the service provider receives a request for service according to preference & service selection. At step 504, option to either accept or deny the request is displayed to the service provider. At step 506, the service provider accepts the request. At step 508, the configuration of the request is displayed to the requestor. At step 510, the route and ETA are displayed in real time to the service provider. At step 512, the route ends on arrival of the service provider to the customer specified location.

Figure 6:
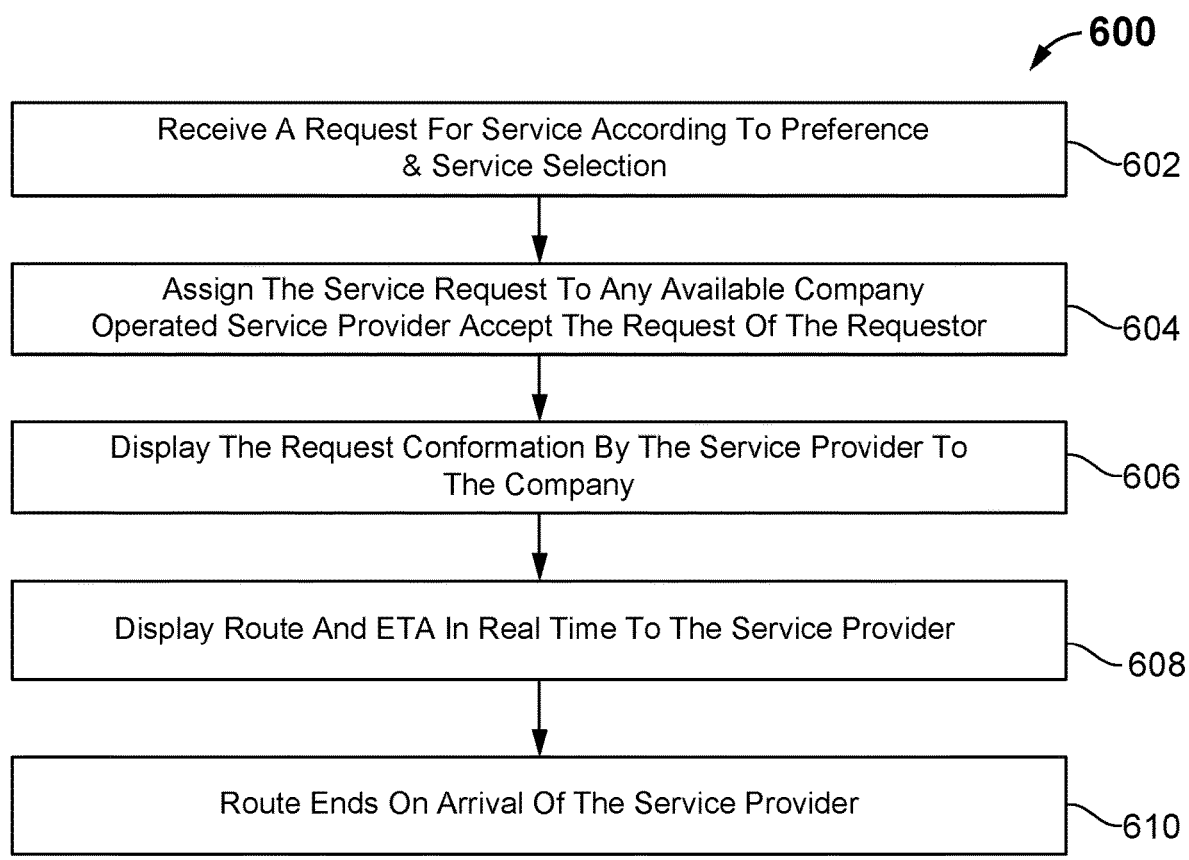
FIG. 6 exemplarily illustrates a process flow of the service provider associated with a company, according to an embodiment of the present invention.

Referring to FIG. 6, a process flow 600 of the service provider associated with a company is illustrated. At step 602, the company receives a request for service according to preference & service selection. At step 604, company assigns the service request to any available company operated service provider accept the request of the requestor. At step 606, the configuration of the request is displayed to the requestor. At step 608, route and ETA are displayed in real time to the service provider. At step 610, the route ends on arrival of the service provider to the customer specified location.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A method for handling a service request, the method comprising:

a control system for controlling, in real-time, the scheduling and dispatch of a service provider and facilitating the communication between the service provider and a requestor, the control system comprising a server, a processor, and a memory unit;

a database in communication with the server for storing information related to the service provider, the requester, map data, and a radius from a specified service location relating to the location of the service provider relative to the requestor;

a requester device associated with the requestor comprising a first display configured to access the server via a network, and a service provider device associated with the service provider comprising a second display configured to access the server via the network, wherein the memory unit stores a set of program modules; and wherein the processor, in communication with the memory unit, is configured to execute the set of program modules to communicate over the network with the requestor device and the service provider device, and further configured to provide output in response to communications received from the control system that are related to a radius from a specified service location, scheduling, and dispatch of the service provider performed by the control system, comprising:

determining the location of the requester device;

upon determination of the location of the requestor device, triggering a service requestor application of the service requestor device to display an interactive graphical user interface on the first display, the real-time location of at least one nearby service provider relative to the radius from a specified service location, prior to receiving a service request from the requestor device;

receiving at the server a service request from the requestor device comprising at least one first criterion comprising at least a service type, a preferred service provider, a service provider rating, a service provider certification, service location, a date, or a time;

locating at least one service provider device within at least one of the radius from a specified service location or satisfaction of the first criterion, triggering a service requestor application of the service requestor device to display located service provider devices within the radius from a specified service location or satisfaction of the first criterion, on an interactive graphical user interface;

triggering a service provider application of the service provider device to display an interactive graphical user interface that presents the service request and provides a service provider an opportunity to respond to the service request;

receiving at least one second criterion comprising at least a service type, a preferred service provider, a service provider rating, a service provider certification, service location, a date, or a time;

triggering a service requestor application of the service requestor device to display located service provider devices that satisfy the second criterion, on an interactive graphical user interface;

triggering a service provider application of the service provider device to display an interactive graphical user interface that presents the service request and provides a service provider an opportunity to respond to the service request;

wherein the service type comprises at least one of plumbing, electrical, roofing, carpentry, HVAC, cleaning, handyman solutions, appliance repair, security, CCTV installation, cable and dish installation, furniture repair, landscaper, tree removal, or pest control, broadcasting via internet communication the service request to the at least one service provider device for a predefined time via the network, displaying on the second display, a service request notification comprises service date, time, or location;

receiving, within the predefined time, at the server an indication from the at least one service provider device to accept the request, upon receiving an indication from the at least one service provider device to accept the request, triggering the creation of a real-time drive route from a current location of the service provider device to a service location, displaying on a map-style graphical user interface on the second display of the service provider device, the real-time drive route from the current location of the service provider device to the service location and the estimated arrival time, receiving service provider acceptance of the service request within the predetermined period of time;

upon receiving service provider acceptance of the service request, sending at least one first notification in real-time to the requestor device of the service request acceptance and triggering determining the movement of at least one service provider device within the radius from the specified service location;

upon determination of movement of the movement of at least one service provider device within the radius from the specified service location, sending at least one second notification in real-time to the requestor device when the service provider device is moving toward the service location;

sending iterative tracking information to the requestor device to track in real-time a current location of the service provider device while the service provider device advances to the service location;

displaying on a map-style iterative graphical user interface overlay on the first display of the requestor device, the real-time current location of the service provider device, distance from the requestor device to the service provider device, a service fee amount, the estimated arrival time, and certifications of the service provider.

2. The method of claim 1, wherein the processor and the program modules are further configured to provide a route to the service provider device in real-time to reach the location specified by the requester device.

3. The method of claim 1, wherein the processor in the program modules are further configured to locate a new set of one or more service provider devices within said particular area within a requestors radius from a specified service location if the server does not receive set indication from the service provider device to accept the request within the predefined time.

4. The method of claim 1, wherein the processor and the program modules are further configured to:
enable the requestor device to set a first criterion to automatically receive notification respective of one or more service provider on satisfaction of the set first criterion, where in the first criterion includes preferred month, day, time and location; and
enable the requestor device to set a second criterion to automatically receive notification of one or more service provider on satisfaction of the set second criterion, wherein the second criterion includes preferred service provider and location of the preferred service provider.

5. The method of claim 1, wherein the processor and the program modules are further configured to enable a service provider device to automatically send notification to one or more requester device on entering a particular location.

6. The method of claim 1, wherein the processor and the program modules are further configured to enable the requester device and/or the service provider device to change, in real-time, a scheduled request, cancelled the request, cancelled the accepted request by the service provider, and change a schedule of the accepted request.

7. The method of claim 1, wherein the processor and the program modules are further configured to send notifications in real-time to the requestor device and/or the service provider device on changes in schedule, cancellation of request, acceptance of request and cancellation of accepted request.

* * * * *